(12) United States Patent
Wu et al.

(10) Patent No.: US 8,846,562 B2
(45) Date of Patent: Sep. 30, 2014

(54) METHOD FOR PREPARING A NANO-CALCIUM CARBONATE SLURRY FROM WASTE GYPSUM AS CALCIUM SOURCE, THE PRODUCT AND USE THEREOF

(71) Applicants: Sufang Wu, Hangzhou (CN); Peiqiang Lan, Hangzhou (CN)

(72) Inventors: Sufang Wu, Hangzhou (CN); Peiqiang Lan, Hangzhou (CN)

(73) Assignee: Zhejiang University, Hangzhou, Zhejiang Province (CN)

( * ) Notice: Subject to any disclaimer, the term of this patent is extended or adjusted under 35 U.S.C. 154(b) by 0 days.

(21) Appl. No.: 13/871,245

(22) Filed: Apr. 26, 2013

(65) Prior Publication Data

US 2013/0288887 A1    Oct. 31, 2013

(30) Foreign Application Priority Data

Apr. 28, 2012    (CN) .......................... 2012 1 0133971

(51) Int. Cl.
*B01J 21/18* (2006.01)
*B01J 27/232* (2006.01)
*B01J 20/30* (2006.01)
*C22B 26/20* (2006.01)

(52) U.S. Cl.
CPC ............... *C22B 26/20* (2013.01); *B01J 27/232* (2013.01); *B01J 20/3078* (2013.01)
USPC ....................................................... 502/174

(58) Field of Classification Search
CPC .................................................. B01J 20/3078
See application file for complete search history.

(56) References Cited

U.S. PATENT DOCUMENTS

| 5,877,226 A * | 3/1999 | Tsuda et al. ..................... 521/76 |
| 2007/0256359 A1* | 11/2007 | Wiltowski et al. ................ 48/61 |
| 2012/0025134 A1* | 2/2012 | Feng et al. ..................... 252/184 |

OTHER PUBLICATIONS

CN 1762572 A, Apr. 26, 2006, (Abstract only).*

* cited by examiner

*Primary Examiner* — Melvin C Mayes
*Assistant Examiner* — Kenneth Vaden
(74) *Attorney, Agent, or Firm* — Jacobson Holman PLLC; Jiwen Chen

(57) ABSTRACT

The present invention discloses a process for producing a nano calcium carbonate slurry from a feedstock of waste gypsum, wherein: an aqueous gypsum slurry of the feedstock is mixed with ammonia water by stirring; with $CO_2$ injected in the slurry is under continuous stirring until the calcium sulfate in the waste gypsum is completely carbonated into nano calcium carbonate; after filtration, the filter cake is dispersed in water to obtain the nano calcium carbonate slurry. This process is easy to operate and to obtain a low-cost and a lower decomposition temperature of calcium carbonate. The present invention also discloses a nano calcium carbonate slurry and its application in preparation of a CaO-based carbon dioxide adsorbent and complex catalyst used for a reactive sorption enhanced reforming process for hydrogen production from methane. The CaO-based carbon dioxide adsorbent prepared shows good cycle stability and fast sorption rate, and complex catalyst used for reactive sorption enhanced methane steam reforming can obtain the hydrogen with purity of more than 90%.

5 Claims, 3 Drawing Sheets

METHOD FOR PREPARING A NANO-CALCIUM CARBONATE SLURRY FROM WASTE GYPSUM AS CALCIUM SOURCE, THE PRODUCT AND USE THEREOF

The present application claims the priority benefit of Chinese Application No. 201210133971.4, filed Apr. 28, 2012, which is hereby incorporated by reference.

FIELD OF THE INVENTION

The present invention relates to the field of material production technology, and in particular, relates to a method for preparation, product and application of a nano calcium carbonate slurry from a feedstock of waste gypsum.

BACKGROUND INFORMATION

Carbon dioxide is a worldwide-recognized main greenhouse gas which causes the global warming. With the rapid development of the economy, the carbon dioxide emission of China is more than 6 billion tons annually. It has surpassed the United States, making China the country with the most carbon dioxide emission in the world. Thus, carbon dioxide emission reduction has become an important issue that urgently needs to be addressed in China.

Among carbon dioxide capture methods, the most popular one is the chemical looping method, where carbon dioxide is absorbed through the carbonation reaction of calcium oxide and carbon dioxide, then formed calcium carbonate is decomposed to re-obtain calcium oxide at a high temperature. Calcium oxide has a high sorption capacity of 0.786 g $CO_2$/g CaO at a high temperature of 600° C. and a fast adsorption rate, and even can achieve the purpose of continuous removal of carbon dioxide in a flue gas by employing a circulating fluidized bed system.

It has now been found through research that the cost of carbon dioxide capture is mainly related to the cost of calcium oxide adsorbent and the stable sorption properties of the adsorbent (MacKenzie A, Granatstein D L, Energy Fuels. 2007, 21(2): 920-926). As the high-temperature carbon dioxide adsorbent calcium oxide derived from high-temperature calcination of natural minerals such as hydrotalcite, dolomite and montmorillonite has the advantages of abundant sources and low cost. But its disadvantage is the low adsorption ratio as well as sorption capacity decaying rapidly in the process of carbonation and regeneration cycles, which may lead to the high cost of carbon dioxide adsorbent. The synthetic CaO-based carbon dioxide adsorbent improved from the perspective of adsorption performance has a higher sorption capacity than natural minerals, but a high cost of raw materials and preparation process is the key problem restricting the industrial application of CaO-based $CO_2$ adsorbents.

Therefore, selecting a kind of a low-cost material containing calcium oxide to be the precursor to prepare an inexpensive calcium oxide adsorbent with excellent adsorption performance and a low cost is an urgent problem needs to be solved.

Phosphogypsum is a solid industrial waste generated from wet phosphoric acid production process, and making 1 ton of phosphoric acid produces 4.5-5 tons of phosphogypsum. With the rapid development of phosphate fertilizer and efficient phosphate industry, the emission of phosphogypsum waste is increasing. In the world, annual phosphogypsum emission amount is about 280 million tons; and China's annual phosphogypsum emission has been more than 50 million tons, accounting for 70% of the industrial gypsum by-products. If there is not a reasonable treatment and utilization, the abundant stockpile of phosphogypsum will restrict the development of the industry as a whole because of the existence of phosphorus pentoxide, fluorine and free acid and other harmful substances in phosphogypsum. Currently, the accumulated stockpile of phosphogypsum in China has more than 250 million tons. However, the effective utilization ratio is less than 20%, even though worldwide average utilization ratio of phosphogypsum is only 4.5%, generally used for low-level applications such as building materials, cement, soil improvement, or directly as a roadbed.

There is generally more than 90% calcium sulfate dehydrate in phosphogypsum as well as undecomposed phosphate rock, residual phosphoric acid, calcium fluoride, the oxide of silicon, iron, aluminum, magnesium, etc. acid insoluble, organic matter and so on. To some extent, the presence of these impurities has an impact on the utilization of phosphogypsum as a chemical resource. So far, the chemical treatment methods of phosphogypsum are as follows: phosphogypsum reduced by carbon at high temperatures to prepare sulfuric acid combined production cement; joint production of hydrogen sulfide and calcium carbonate; joint production of ammonium sulfate and calcium carbonate.

China Patent Publication No. CN101492178A discloses a process for joint production of ammonium sulfate and calcium carbonate from phosphogypsum. In this process, firstly, after size mixing, rinsing, sedimentation and sieving, phosphogypsum's whiteness reaches to 75-85%. Then an additive and ammonium carbonate were added into the phosphogypsum slurry, and the reaction temperature was kept at 30-60° C. for 0.5-2 hours. After that, the temperature of the slurry was reduced to room temperature, the slurry was filtered and water was added to filter cake to get calcium carbonate slurry. Then a surface modifier was added, and after a certain reaction time, the product was filtered and dried to obtain calcium carbonate of a purity greater than 93% with an average particle diameter of 1 to 5 microns.

Zhang Wan-fu's study named "Industrialization analysis of ammonia sulphate from phosphogypsum" (Chemical Engineering, 2009, 37 (011): 75-78) reports the optimal reaction conditions of the reaction of phosphogypsum and ammonium carbonate to prepare calcium carbonate. The conditions are as follows: the reaction temperature is 60° C., the reaction time is 1 hour, the molar ratio of ingredients (ammonium carbonate to phosphogypsum) is 1:1, the mass ratio of liquid to solid (water to phosphogypsum) is 5:1, the amount of ammonia (molar ratio of ammonia to phosphogypsum) is 0.8:1, and stirring speed is 300 r/min, thus the obtained calcium carbonate is mainly hexagonal system calcite type.

China Patent Publication No. CN101993105A discloses a process for preparation of precipitated calcium carbonate from phosphogypsum with phase transfer agents such as ammonium sulfate, ammonium salt or sodium salt of an organic acid. In this process, phosphogypsum is transformed into a soluble calcium ion solution by phase-transfer reaction, and then a mixture of ammonium bicarbonate and ammonia or carbonation agent of solid ammonium carbonate is added to the solution. The precipitate is separated to obtain the calcium carbonate with a purity of more than 97% and particle size of about 1 micron.

In the above literatures, the calcium carbonate prepared from phosphogypsum acts as inorganic filler, which requires high purity, thus leading to complicated process and high cost.

China Patent Publication No. CN101337685A is disclosed a process for preparation of calcium carbonate using solid residues obtained from phosphogypsum and carbon pyrolysis to absorb carbon dioxide produced in the phosphate industry at 25-80° C. The calcium carbonate mass content is 75-85%. It is also used as a filler after treatment.

Currently, there are few studies about phosphogypsum treated to be a carbon dioxide adsorbent. The literature (C Cárdenas-Escudero, V Morales-Flórez, etc. Journal of Hazardous Materials, 2011, 196 (0): 431-435) reports that sodium hydroxide solution was added into a phosphogypsum slurry, and then the slurry is filtered to obtain the calcium hydroxide filter cake. The filter cake is dispersed in water, and then carbon dioxide is bubbled in at lower than 80° C. or at room temperature to complete wet carbon dioxide capture. The feature of this process is that it uses phosphogypsum to prepare calcium hydroxide and then the calcium hydroxide reacts with carbon dioxide to capture carbon dioxide. The carbonation reaction is occurred at room temperature and the carbon dioxide passed into is pure.

Since "eleventh five-year plan" a large number of desulphurization facilities in thermal power plants have been built up and put into production in China. More than 90% of the desulphurization facilities in China employ the limestone-gypsum desulfurization process. However it results the production of a large number of desulfurization by-products—FGD gypsum. In 2010, annual output of FGD gypsum in China is more than 20 million tons. At present, the utilization ratio of the FGD gypsum in China is only 30%. A large number of FGD gypsum is stacked or filled in the sea. It not only occupies a lot of land but also cause secondary pollution because of the sulfur off back to the ground.

Fluorine gypsum is the by-product of preparation of hydrofluoric acid using fluorite and concentrated sulfuric acid in the fluoride salt factory. Due to the residues of a certain amount of sulfuric acid or hydrogen fluoride in fluorine gypsum, directly stockpiling of fluorine gypsum not only occupies the land, but also pollutes the soil and groundwater environment, causing serious environmental pollution in the stacking process.

SUMMARY OF THE INVENTION

The present invention provides a process for preparation of a nano calcium carbonate slurry with waste gypsum as calcium source. This process is easy to operate and low-cost and the decomposition temperature of obtained calcium carbonate is low.

The present invention relates to a process for producing a nano calcium carbonate slurry from a feedstock of waste gypsum, wherein: an aqueous gypsum slurry of the feedstock is mixed with ammonia water by stirring and $CO_2$ being injected into the slurry. The slurry is stirred continuously until the calcium sulfate in the waste gypsum is completely transformed into nano calcium carbonate. After filtration of the slurry, the filter cake is dispersed in water to obtain the nano calcium carbonate slurry.

The existing technology for preparation of nano calcium carbonate is bubbling carbon dioxide into a calcium hydroxide slurry to obtain nano calcium carbonate, while the present invention is injecting carbon dioxide into a calcium sulfate slurry containing ammonia to obtain nano calcium carbonate with byproduct ammonium sulfate. The principle of the present invention is as follows: due to the calcium hydroxide is more alkaline than ammonia, the reaction formula (1) cannot be carried out; instead, according to the reaction formula (2) and (3), the carbon dioxide is firstly reacted with ammonia to generate ammonium carbonate, and then ammonium carbonate and calcium sulfate react to get calcium carbonate and ammonium sulphate. The nano calcium carbonate can be obtained by controlling the speed of the formation of calcium carbonate.

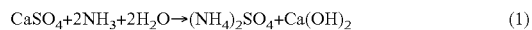

$$CaSO_4 + 2NH_3 + 2H_2O \rightarrow (NH_4)_2SO_4 + Ca(OH)_2 \quad (1)$$

$$2NH_3 + CO_2 + H_2O \rightarrow (NH_4)_2CO_3 \quad (2)$$

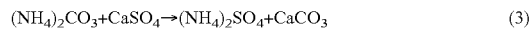

$$(NH_4)_2CO_3 + CaSO_4 \rightarrow (NH_4)_2SO_4 + CaCO_3 \quad (3)$$

The waste gypsum is phosphogypsum, desulfurization gypsum or fluorgypsum.

The mass ratio of waste gypsum to water in aqueous gypsum slurry is 1:1-10; the molar ratio of ammonia to calcium sulfate in waste gypsum is 1-5:1; the mass ratio of filter cake to water in nano calcium carbonate slurry is 1:1-10.

The carbon dioxide can be pure carbon dioxide gas or flue gas or enriched carbon dioxide gas, such as: flue gas of 15% volume fraction of carbon dioxide, cement factory exhaust gas of 15% volume fraction of carbon dioxide, enriched carbon dioxide gas of 90% volume fraction of carbon dioxide.

As a calcium source, waste gypsum is mixed with ammonia, and then carbon dioxide is injected in the mixture to prepare calcium carbonate. During the preparation, the nucleation rate and crystal size of calcium carbonate can be controlled through controlling of the reaction time and temperature. The amount of carbon dioxide is above the stoichiometric of the chemical reactions, the time is 1-10 hours and the temperature is room temperature to 90° C.

The present invention also provides the nano calcium carbonate slurry prepared by the above method.

Further, the present invention also provides an application of the nano calcium carbonate slurry prepared by the above method in preparation of CaO-based carbon dioxide adsorbent. Dispersing agents and binders are added into the nano calcium carbonate slurry, which is stirred until uniform, dried, molded, and calcinated to obtain CaO-based $CO_2$ adsorbent.

The binder is an alumina sol or a silica sol; the mass ratio of $Al_2O_3$ in the alumina sol to $CaCO_3$ in the nano calcium carbonate slurry is 0-0.7:1; the mass ratio of $SiO_2$ in the silica sol to $CaCO_3$ in the nano calcium carbonate slurry is 0-0.7:1.

The mass ratio of the dispersing agent to the nano calcium carbonate slurry is 0.002-0.005:1; and the dispersing agent is polyethyleneglycol stearate or polyethylene glycol or sodium dodecylbenzenesulfonate.

The condition of drying is under the temperature range of 80-150° C. for 1-15 hours.

The molding is extruded molding or spray granulation molding.

The condition of calcination is under the temperature range of 750-950° C. for 1-12 hours. Nano calcium carbonate will be decomposed into nano calcium oxide as CaO-based carbon dioxide adsorbent after high temperature calcinations.

The carbon dioxide adsorbent prepared by the method in the present invention is one that can be applied to capture $CO_2$ at a high temperature about 600° C. At about 600° C. high temperature, calcium oxide reacts with carbon dioxide to produce calcium carbonate, and then calcium carbonate formed is calcined at above 750° C. to regenerated calcium oxide. Carbon dioxide can be removed constantly with the calcium looping.

As the particle size of waste gypsum particles is less than 100 micrometers, crystal size of the calcium carbonate obtained by precipitation is even smaller. Therefore, calcium carbonate prepared by precipitation with waste gypsum as raw materials has a lower decomposition temperature and a faster decomposition rate. The adding of a binder during the adsorbent preparation process ensures the stability and fluidity of CaO-based carbon dioxide adsorbent.

Further, the present invention also provides an application of the nano calcium carbonate slurry in preparation of a complex catalyst for the reactive sorption enhanced methane steam reforming. The nano calcium carbonate slurry is mixed with a nickel salt solution and a binder. The complex catalyst for the reactive sorption enhanced methane steam reforming is obtained by spray granulation of the mixture, drying, and calcination.

The nickel salt is nickel nitrate hexahydrate, nickel acetate tetrahydrate or trinickel dicitrate.

The binder is alumina sol or silica sol.

In order to obtain better dispersion of nickel in the catalyst, to improve the activity of the catalyst, and minimize the amount of each component and manufacturing cost savings, the mass ratio of each component in the complex catalyst is $CaCO_3:NiO:Al_2O_3:SiO_2=0.45-0.6:0.1-0.15:0.25-0.4$.

The condition of drying is under the temperature range of 80-150° C. for 1-15 hours; the condition of calcination is under the temperature range of 400-650° C. for 2-5 hours. In the calcination process, the nickel salt is decomposed into nickel oxide. Since calcium carbonate cannot be calcined to calcium oxide below 750° C., the complex catalyst obtained after calcination contains nickel oxide and calcium carbonate.

The complex catalyst is applied in the reactive sorption enhanced methane steam reforming, wherein: the reaction temperature is 550-650° C.; the reaction pressure is atmospheric pressure to 5 atm; the ratio of steam to carbon is 3:1 to 6:1; the regeneration temperature of complex catalyst is between 750 to 950° C.

Compared with existing technology, the present invention has the following advantages:

(1) It uses solid industrial waste phosphogypsum, desulfurization gypsum or fluorgypsum as the raw materials, and not only micron calcium carbonate slurry but also nano calcium carbonate slurry can be obtained. Further, the calcium carbonate slurry can be applied to prepare CaO-based carbon dioxide adsorbent and complex catalyst. This process not only reduces waste gypsum stacking, turning waste into treasure, but also makes use of the carbon dioxide in the flue gas. Preparation method is simple and the cost is low, achieving the purposes of carbon dioxide emission reduction and resource utilization.

(2) It does not need to remove impurities in phosphogypsum raw material, because $P_2O_5$ and sulfate exist as crystallization directing agents that are conducive to the preparation of nano-calcium carbonate. $SiO_2$ contained in the phosphogypsum raw materials can lower the decomposition temperature of calcium carbonate to save energy, about 50° C. lower than analytically pure calcium carbonate.

(3) The nano CaO-based carbon dioxide adsorbent obtained by the present invention has a fast sorption rate. Compared with nano CaO-based carbon dioxide adsorbent prepared from pure nano calcium carbonate, the maximum adsorption rate of the nano CaO-based carbon dioxide adsorbent obtained by the present invention is 1.55 times than that of nano CaO-based carbon dioxide adsorbent from pure nano calcium carbonate. It is applicable to the circulating fluidized bed for carbon dioxide capture from flue gas and the reactive sorption enhanced reforming process for hydrogen production from methane. In addition, it shows advantage of high stability in cycles, and after ten cycles, the conversion is higher by 5-40% than that of limestone.

(4) The adsorbent prepared by the present invention can be used for the removal of carbon dioxide in the flue gas or somewhere gas emission containing carbon dioxide.

(5) The complex catalyst obtained by the present invention is applicable to reactive sorption enhanced reforming process for hydrogen production from methane and a purity of more than 90% hydrogen can be obtained.

EXAMPLES

The following illustrates the present invention in detail with reference to examples, but the present invention is not limited to these examples.

Example 1

Preparation of Nano Calcium Carbonate Slurry 100 g of phosphogypsum containing 92% calcium sulfate dihydrate and 400 g of water were mixed in the reactor to obtain a slurry of phosphogypsum. Under rapid stirring, temperature was raised to 40° C., and then remained isothermal. 91 g of 30% mass fraction of aqueous ammonia solution and phosphorus gypsum slurry were mixed, passed into enriched carbon dioxide gas with 90% of the volume fraction, with minute ventilation of 222 ml/min for 5 hours, then filtered to get nano calcium carbonate cake and ammonium sulfate filtrate. The filter cake was dispersed in 107 g of water to obtain the nano calcium carbonate slurry.

When nano calcium carbonate slurry was dried at 80° C. for 15 hours, nano calcium carbonate was obtained, denoted by cc.

The average particle diameter of nano calcium carbonate obtained in this example was 50 nm.

Figure 1:
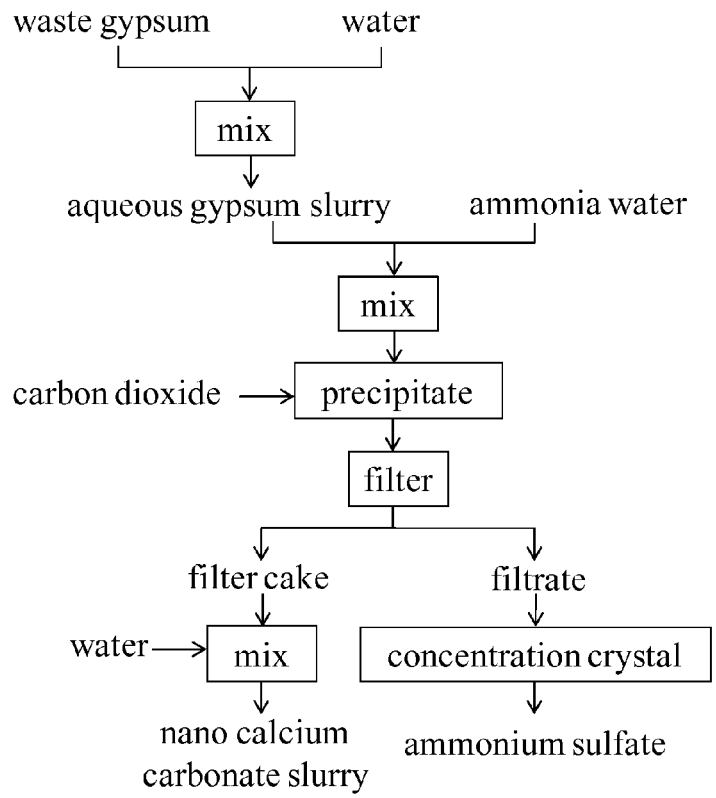
FIG. 1 is a process flow diagram of preparation of the nano calcium carbonate slurry using waste gypsum.
Figure 2:
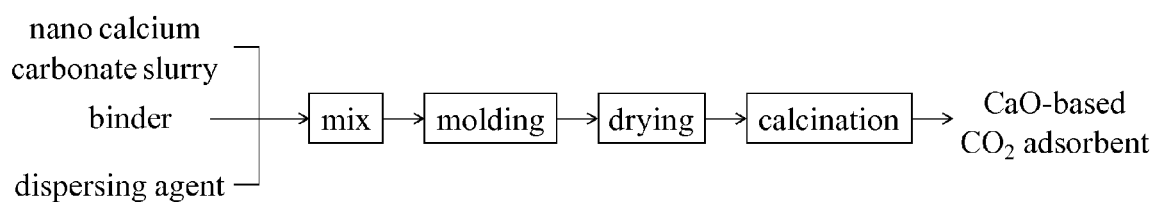
FIG. 2 is a process flow diagram of preparation of CaO-based carbon dioxide adsorbent using the nano calcium carbonate slurry.
Figure 3:
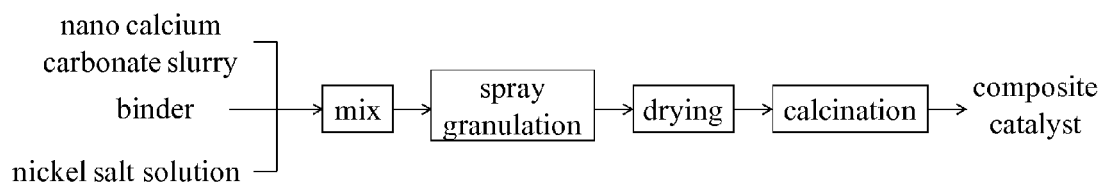
FIG. 3 is a process flow diagram of preparation of a complex catalyst applied in a reactive sorption enhanced reforming process for hydrogen production from methane using the nano calcium carbonate slurry.
Figure 4:
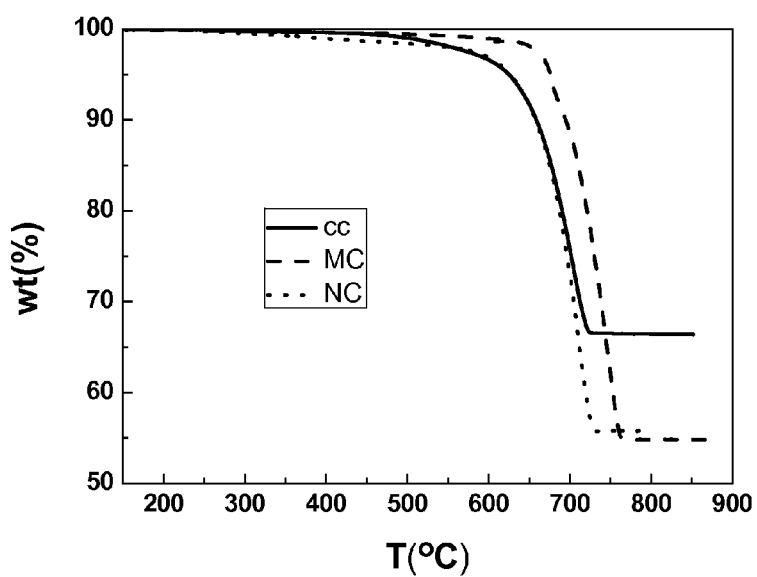
FIG. 4 is decomposition graph of the nano calcium carbonate.

The decomposition temperature of calcium carbonate was tested using thermal gravimetric analysis (TGA) in a nitrogen atmosphere. Calcium carbonate was heated from 150° C. to 850° C. at the heating rate of 15° C./min. The test results are shown in FIG. 4, wherein, MC represents an analytically pure calcium carbonate (particle size of 20 microns), NC represents the nano calcium carbonate (particle size of 70 nm).

Example 2

Preparation of Nano Calcium Carbonate Slurry 100 g of desulfurization gypsum containing 93% calcium sulfate dihydrate and 200 g of water were mixed in the reactor to obtain a slurry of phosphogypsum. Under rapid stirring, the temperature was raised to 30° C., and then remained isothermal. 80 g of 30% mass fraction of aqueous ammonia solution and phosphorus gypsum slurry were mixed, and passed into enriched carbon dioxide gas with 90% of the volume fraction, with minute ventilation of 133 ml/min for 2 hours, then were filtered was to get nano calcium carbonate cake and ammonium sulfate filtrate. The filter cake was dispersed in 214 g of water to obtain the nano calcium carbonate slurry.

When nano calcium carbonate slurry was dried at 80° C. for 15 hours, nano calcium carbonate was obtained. The average particle diameter of nano calcium carbonate obtained in this example is 70 nm.

Example 3

Preparation of Nano Calcium Carbonate Slurry 100 g of fluorgypsum containing 92% calcium sulfate dihydrate and 300 g of water were mixed in the reactor to obtain a slurry of phosphogypsum. Under rapid stirring, the temperature was raised to 60° C., and then remained isothermal. 60.6 g of 30% mass fraction of aqueous ammonia solution and phosphorus gypsum slurry were mixed, and passed into flue gas with 15% of the volume fraction, with minute ventilation of 266 ml/min for 3 hours. The slurry was filtered to get a nano calcium carbonate cake and ammonium sulfate filtrate. The filter cake was dispersed in 160 g of water to obtain the nano calcium carbonate slurry.

When nano calcium carbonate slurry was dried at 80° C. for 15 hours, nano calcium carbonate was obtained. The average particle diameter of nano calcium carbonate obtained in this example is 140 nm.

Example 4

Preparation of CaO-Based Carbon Dioxide Adsorbent 0.8 g of polyethylene glycol was added to the nano calcium carbonate slurry prepared in Example 1 of the present invention. In the state of sufficiently stirring and room temperature, 374.5 g of 10% mass fraction alumina sol was added dropwise. After the dropwise addition, continued stirring for 2 hours. Then spray granulated, dried at 100° C. for 10 hours and calcined at 900° C. for 8 hours to obtain CaO-based carbon dioxide adsorbent nc-Al-1.

The average particle diameter of CaO-based carbon dioxide adsorbent prepared in this example is 17 microns.

Example 5

Preparation of CaO-Based Carbon Dioxide Adsorbent 0.8 g of sodium dodecylbenzenesulfonate was added to the nano calcium carbonate slurry prepared in Example 2 of the present invention. In the state of sufficiently stirring and room temperature, 297.2 g of 10% mass fraction alumina sol was added dropwise. After the dropwise addition, continued stirring for 2 hours. Then spray granulated, dried at 150° C. for 12 hours and calcined at 950° C. for 12 hours to obtain CaO-based carbon dioxide adsorbent nc-Al-2.

The average particle diameter of CaO-based carbon dioxide adsorbent prepared in this example is 17 microns.

Example 6

Preparation of CaO-Based Carbon Dioxide Adsorbent 1 g of polyethyleneglycol stearate was added to the nano calcium carbonate slurry prepared in Example 1 of the present invention. In the state of sufficiently stirring and room temperature, 59.4 g of 10% mass fraction silica sol was added dropwise. After completing the dropwise addition, continued the stirring for 2 hours. Then extruded, dried at 80° C. for 5 hours and calcined at 800° C. for 3 hours to obtain CaO-based carbon dioxide adsorbent nc-Si-1.

After grinding and sieving, the CaO-based carbon dioxide adsorbent prepared in this example has a particle diameter range of 60 to 80 microns.

Example 7

Preparation of CaO-based Carbon Dioxide Adsorbent 0.8 g of polyethyleneglycol stearate was added to the nano calcium carbonate slurry prepared in Example 1 of the present invention. In the state of sufficiently stirring and room temperature, 80 g of 10% mass fraction silica sol was added dropwise. After completion of the dropwise addition, continued the stirring for 2 hours. Then spray granulated, dried at 90° C. for 12 hours and calcined at 850° C. for 1 hour to obtain CaO-based carbon dioxide adsorbent nc-Si-2.

The average particle diameter of CaO-based carbon dioxide adsorbent prepared in this example is 17 microns.

Example 8

Preparation of Complex Catalyst

Nano calcium carbonate slurry prepared in Example 1 of the present invention and 91.4 g of nickel nitrate hexahydrate were mixed with 200 ml of water. Then the slurry was mixed with 475.6 g of 10% mass fraction alumina sol, extruded after drying at 90° C. for 10 hours, dried at 90° C. for another 5 hours and calcined at 550° C. for 2 hours to obtain complex catalyst used for reactive sorption enhanced reforming process for hydrogen production from methane.

The complex catalyst prepared in this example was applied in a reactive sorption enhanced reforming process for hydrogen production from methane. After the complex catalyst calcinated at high temperature of 750° C. and reduced with hydrogen, the reaction was carried out at a reaction temperature of 550° C. and the mole ratio of water to $CH_4$ of 3:1 under normal atmospheric pressure. The content of the hydrogen obtained is 91%.

Example 9

Preparation of Complex Catalyst

Nano calcium carbonate slurry prepared in Example 1 of the present invention and 29.1 g of trinickel dicitrate were mixed with 100 ml of water, then mixed with 267.5 g of 10% mass fraction silica sol, spray granulated, dried at 150° C. for 10 hours and calcined at 400° C. for 10 hours to obtain complex catalyst used for reactive sorption enhanced reforming process for hydrogen production from methane.

The complex catalyst prepared in this example was applied in a reactive sorption enhanced reforming process for hydrogen production from methane. After calcination at high temperature of 850° C. and reduction with hydrogen, the reaction was carried out at a reaction temperature of 600° C. and the mole ratio of water to $CH_4$ of 4:1 under the reaction pressure of 3 atm. The content of the hydrogen obtained is 92%.

Example 10

Preparation of Complex Catalyst

Nano calcium carbonate slurry prepared in Example 2 of the present invention and 85.3 g of nickel acetate tetrahydrate were mixed with 200 ml of water, then mixed with 243.3 g of 10% mass fraction alumina sol, spray granulated, dried at 100° C. for 13 hours and calcined at 450° C. for 6 hours to obtain complex catalyst used for reactive sorption enhanced reforming process for hydrogen production from methane.

The complex catalyst prepared in this example was applied in a reactive sorption enhanced reforming process for hydrogen production from methane, after calcination at high temperature of 950° C. and reduction with hydrogen, the reaction was carried out at a reaction temperature of 650° C. and the mole ratio of water to $CH_4$ of 6:1 under the reaction pressure of 5 atm. The content of the hydrogen obtained is 92%.

Test Analysis

Figure 5:
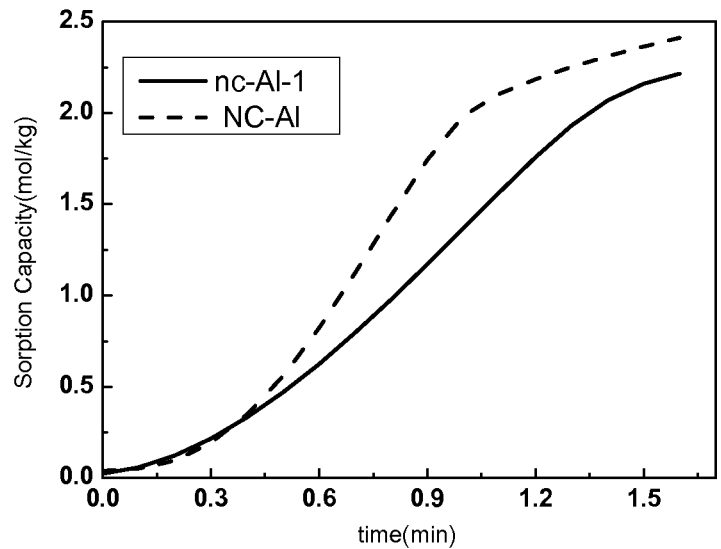
FIG. 5 is the sorption rate of the CaO-based carbon dioxide adsorbent prepared from phosphogypsum.
Figure 6:
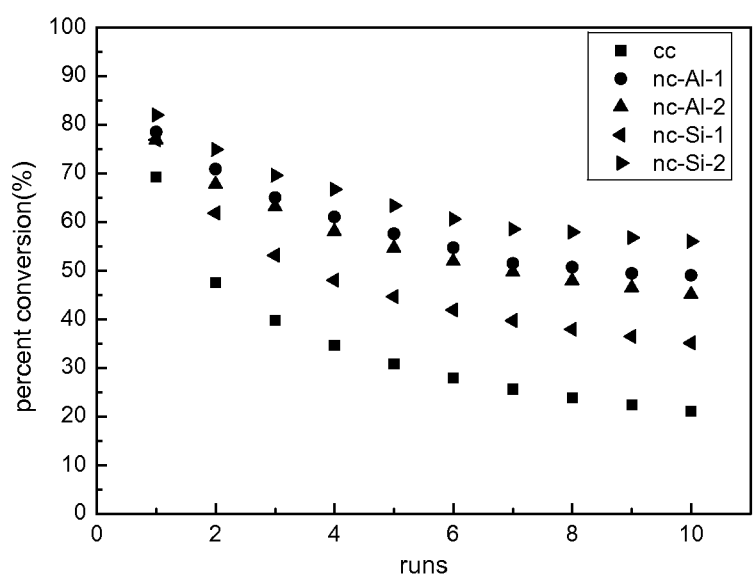
FIG. 6 is the cyclic sorption capacity of the CaO-based carbon dioxide adsorbent prepared from phosphogypsum.

The CaO-based carbon dioxide adsorbents prepared in Examples 4-7 of the present invention were tested in the thermal gravimetric analysis (TGA). Conditions are as follows: the sorption reaction at a temperature of 500 to 650° C. with 0.01-0.02 MPa $CO_2$, regeneration reaction at a temperature of 700 to 800° C. both under a $N_2$ atmosphere. The results of sorption rate are shown in FIG. 5 while the cyclic sorption capacity of CaO-based carbon dioxide adsorbent in FIG. 6, wherein the adsorbent NC—Al is from literature Su, F. Wu, Ming Z. Jiang, Ind. Eng. Chem. Res. 2010, 49, 12269-12275.

The invention claimed is:

1. A method for preparation of a CaO-based $CO_2$ adsorbent from a nano calcium carbonate slurry comprising the steps of: adding a dispersing agent and a binder to the nano calcium carbonate slurry, stirring until uniform, drying, molding, calcination to obtain the CaO-based $CO_2$ adsorbent, wherein the nano calcium carbonate slurry is produced from the following steps: (a) an aqueous gypsum slurry of waste gypsum is mixed with ammonia water by stirring; (b) with $CO_2$ being injected in the slurry, the slurry is under continuous stirring until the calcium sulfate in the waste gypsum is completely formed nano calcium carbonate; (c) after filtration, a filter cake is dispersed into water to obtain a slurry of nano calcium carbonate.

2. The process according to claim 1, wherein the waste gypsum is phosphogypsum, desulfurization gypsum or fluorgypsum.

3. The process according to claim 1, wherein the mass ratio of waste gypsum to water in aqueous gypsum slurry is 1:1-10; the molar ratio of ammonia to calcium sulfate in waste gypsum is 1-5:1; the mass ratio of filter cake to water in nano calcium carbonate slurry is 1:1-10.

4. The method according to claim 1, wherein: the binder is alumina sol or silica sol; the mass ratio of $Al_2O_3$ in alumina sol to $CaCO_3$ in nano calcium carbonate slurry is 0-0.7:1; the mass ratio of $SiO_2$ in silica sol to $CaCO_3$ in nano calcium carbonate slurry is 0-0.7:1; the mass ratio of dispersing agent to nano calcium carbonate slurry is 0.002-0.005:1, the dispersing agent is polyethyleneglycol stearate or polyethylene glycol or sodium dodecylbenzenesulfonate.

5. The method according to claim 1, wherein: the condition of drying is under the temperature range of 80-150° C. for 1-15 hours; the condition of calcination is under the temperature range of 750-950° C. for 1-12 hours; the molding is extruded molding or spray granulation molding.

* * * * *